United States Patent [19]

Bonel et al.

[11] Patent Number: 4,692,323
[45] Date of Patent: Sep. 8, 1987

[54] PROCESS FOR SEPARATION OF MAGNESIUM-BASED, AND POSSIBLY FLUORINE-AND ALUMINUM-BASED IMPURITIES FROM A WET-PRODUCED PHOSPHORIC ACID

[75] Inventors: Gilbert Bonel, Toulouse; Jean C. Heughebaert, Castanet-Tolosan, both of France; Mohamed Chaabouni; Hassine Ayedi, both of Sfax, Tunisia

[73] Assignee: Centre National de la Recherche Scientifique (C.N.R.S.), Paris, France

[21] Appl. No.: 878,976

[22] PCT Filed: Sep. 13, 1985

[86] PCT No.: PCT/FR85/00247

§ 371 Date: Jun. 12, 1986

§ 102(e) Date: Jun. 12, 1986

[87] PCT Pub. No.: WO86/01792

PCT Pub. Date: Mar. 27, 1986

[30] Foreign Application Priority Data

Sep. 14, 1984 [FR] France ................................ 84 14734

[51] Int. Cl.$^4$ .............................................. C01B 25/16
[52] U.S. Cl. .............................. 423/321 R; 423/158; 423/317; 423/465
[58] Field of Search ................... 423/321 R, 158, 320, 423/465, 472, 317

[56] References Cited

U.S. PATENT DOCUMENTS

| 3,328,123 | 6/1967 | Parks et al. ..................... 423/321 R |
| 3,642,439 | 2/1972 | Moore et al. ................... 423/321 R |
| 4,299,804 | 11/1981 | Parks et al. ..................... 423/321 R |
| 4,500,502 | 2/1985 | McDonald et al. ............. 423/321 R |
| 4,554,144 | 11/1985 | Ore ................................... 423/321 R |
| 4,639,359 | 1/1987 | Michulski et al. .............. 423/321 R |

FOREIGN PATENT DOCUMENTS

| 420173 | 10/1925 | Fed. Rep. of Germany . |
| 487848 | 12/1929 | Fed. Rep. of Germany . |
| 2065265 | 7/1971 | France . |
| 2015985 | 9/1979 | United Kingdom . |

Primary Examiner—Gregory A. Heller
Attorney, Agent, or Firm—Harold H. Dutton, Jr.

[57] ABSTRACT

The invention concerns a process for separating magnesium-based impurities contained in a wet-process produced phosphoric acid. This process comprises adding an ammonium compound R(NH$_4$) soluble in the said phosphoric acid, and, where called for, a fluorine compound and an aluminum compound to this phosphoric acid so as to induce a reaction forming an insoluble complex (NH$_4$)$_x$ (Mg)$_y$ (Al)$_z$ (F, OH)$_6$; this complex crystallizes in large grains and is easily separated subsequently by filtration and decantation.

13 Claims, No Drawings

PROCESS FOR SEPARATION OF MAGNESIUM-BASED, AND POSSIBLY FLUORINE-AND ALUMINUM-BASED IMPURITIES FROM A WET-PRODUCED PHOSPHORIC ACID

The invention relates to a process for separating magnesium-based impurities and possibly fluorine-based and aluminum-based impurities contained in a wet-produced phosphoric acid, that is by acidification of a phosphate mineral using a mineral acid, in general sulfuric acid. In most industrial plants using the wet process, the acid obtained is a solution with a content by weight of $P_2O_5$ near 30% (generally between 25 and 35%), with the content by weight being defined in relation to the weight in grams of $P_2O_5$ per 100 g of phosphoric acid.

BACKGROUND AND OBJECTS OF THE INVENTION

The phosphoric acid solutions prepared by the wet process contain several impurities, in particular magnesium of which the proportion depends on the original mineral; this element is an exceedingly bothersome impurity because in the long run causing precipitates that turn into sediments in the tanks and in the plant conduits: beyond the practical difficulties thus raised, these sediments or deposits entail more than trivial losses of $P_2O_5$. Also, the Mg impurities create difficulties, well known to the experts, in most subsequent processing of phosphoric acid (manufacture of fertilizers, of superphosphoric acid).

Furthermore the phosphoric acid solutions prepared by the wet process also contain most of the time aluminum-based and/or fluorine-based impurities which, though somewhat less interfering than the above impurities, nevertheless may entail parasitic precipitations.

The quantities of phosphoric acid produced by the wet process are very large (37 million tons of phosphoric acid were produced in the world in 1975, of which 84% by the wet process), and much research has been carried out toward its purification which presently is done by three methods:
 extraction by solvent, which is a recent process being developed, with the drawback that complex equipment is needed that increases substantially capital expenditures,
 exhaustion on ion exchange resins, which is an older process with the drawback of being very costly and also requiring complex equipment,
 precipitation in the form of insoluble complexes and separation by filtration or decantation.

The object of the invention is a process of the latter kind.

Presently essentially two chemical reactions are known which are applied to precipitate the magnesium and possibly also aluminum and fluorine.

French patent No. 2,065,265 (Allied Chemical Corp.) describes a process for eliminating magnesium, aluminum and fluorine in the form of a magnesium-aluminum phosphate fluoride precipitate obtained by adding fluoride and aluminum ions to be phosphoric acid in suitable amounts to obtain such a compound.

French patent No. 2,419,254 (Agrico Chemical Co.) describes a separation process for the magnesium and aluminum impurities by precipitating them in the form of $MgAl_2F_8$—$MgAlF_5$ by adding fluoride ions and where called for aluminum ions to the phosphoric acid in suitable proportions to obtain these compounds.

These two patents should be consulted for further details on the reactions taking place and the operating conditions; these reactions offer the advantage of requiring only very little additional equipment in phosphoric acid production plants. However the precipitates obtained in both cases are in gelatinous form and entail a relatively delicate and long physical separation (filtration or decantation); moreover, the gelatinous structure captures and adsorbs the phosphoric acid and causes a significant reduction in $P_2O_5$ content and therefore a reduction in overall yields of manufactured acid. Again, these two precipitation reactions are slow and require several tens of hours for effective precipitation, whereby the production cycle of the phosphoric acid is lengthened by as much and the volume of the decantation tanks required is increased.

The present invention proposes to provide a new process for separating magnesium impurities and where called for aluminum and fluorine impurities, from phosphoric acid by carrying out a novel precipitation reaction resulting in forming a new insoluble complex.

The invention seeks to benefit from the advantages of this precipitation process (ease of implementation and low equipment cost) while also eliminating the above discussed drawbacks of the known procedures of this type.

An object of the invention is in particular to induce formation of a crystalline precipitate comprising crystals larger than 0.1 microns which are easily separated by filtration o decantation and which only very slightly adsorb phosphoric acid.

Another object is to reduce the precipitation times for decreasing them to on the order of several tens of minutes to several hours.

DESCRIPTION OF THE INVENTION

To that end, the process of the invention comprises
 in the case in which the atomic ratio of the impurities $rf = F/Mg$ (of fluorine to magnesium) is less than 3, adding a fluorine compound to the phosphoric acid in order to increase this atomic ratio to a value of at least 4,
 in the case in which the atomic ratio of the impurities $ra = Al/Mg$ (of aluminum to magnesium) is less than 0.5, adding an aluminum compound to the phosphoric acid in order to increase this atomic ratio to a value at least equal to 0.5,
 adding to the phosphoric acid an ammonium compound $R(NH_4)$ soluble in the phosphoric acid in such a manner as to cause a reaction forming an insoluble complex of ammonium, magnesium, fluorine and aluminum, and physically separating the complex.

Analysis of the precipitate obtained has shown it contains a complex of the following general formula:

$$(NH_4)_x (Mg)_y (Al)_z (F,OH)_6$$

wherein: $0.15 \leq x/y \leq 1$ and $1.0 \leq z/y \leq 1.5$.

The values x, y and z of this complex depend on the initial content of Mg, Al and F in the treated phosphoric acid and of the operating conditions (relative proportion of the added ammonium compound, temperature); these parameters also affect any substitution F <—> OH.

In every instance the precipitate is obtained in several tens of minutes and the compound comprises crystallites between 0.1 and 1 micron which can be separated extremely easily and rapidly. This separation can be easily implemented by filtration or decantation or by a combination of both. Negligible decrease of the P₂O₅ content was observed in the acid following precipitation and washing, which is explained by the very low absorption power of the large-size crystals of the compound.

It should be noted that U.S. Pat. No. 3,328,123 uses an ammonium compound to eliminate iron- and aluminum-based impurities. However the procedure described in this patent does not allow obtaining an insoluble complex of the type of the invention because even if the medium were to contain magnesium, it would not contain the fluoride ions required to form this complex; accordingly any magnesium present would remain in the phosphoric acid. Therefore, in spite of the early date (1964) of the above mentioned U.S. patent, the industrial procedures for eliminating magnesium resort to other techniques which are much less advantageous than that of the invention, with the magnesium elimination remaining presently a crucial problem poorly solved.

In a preferred embodiment, the ammonium compound R(NH₄) is added to the phosphoric acid in a proportion depending on the Mg content of this acid and such that the molar ratio NH₄/Mg of the obtained medium shall be substantially between 0.5 and 4.

In case the phosphoric acid being treated contains little or no fluorine or aluminum impurities, the process according to the invention adds fluorine or aluminum compounds preferably in such a manner that the atomic ratios rf and ra shall be within the following ranges:

$4.0 \leq rf \leq 20$ $0.8 \leq ra \leq 2.$

The above proportions make it possible to favor the formation of the above mentioned ammonium complex at the expense of other complexes that might also form, in particular MgAl (F, HO)₅. It is notable that even within the above cited ranges of molar and atomic ratios, the latter complex may be obtained, in a low proportion with respect to the ammonium complex; this "parasitic" production may be avoided by increasing the amount of ammonium with respect to the aluminum so that the atomic ratio rn=NH₄/Al exceeds 1.

It was observed that the ammonium complex precipitates while retaining water in variable amounts depending on the operating conditions, on the initial contents in impurities, on the initial dilution of the acid and on the processing temperature.

Preferably the process is carried out at a temperature between 50° and 70° C., in particular near 60° C.; this temperature is close to the natural temperature of the phosphoric acid at the end of its production cycle, whereby no additional heating or cooling system need be provided.

Furthermore, to favor the crystallization of the above cited ammonium complex, the phosphoric acid may be seeded by adding the previously obtained insoluble ammonium complex. This seeding may be carried out using a proportion by weight of about 1% to several percent of the total mass of the precipitate to be obtained.

Generally phosphoric acid is produced for fertilizers. In this case the ammonium compound being used preferably is ammonium nitrate so as to pre-enrich the phosphoric acid with nitrate which remains dissolved in it; it is also possible to use ammonia as the compound, this material being available near the industrial manufacturers of fertilizers.

For the same reasons (nitrate enrichment), if an aluminum compound is to be added, it should preferably be in the form of aluminum nitrate.

If a fluorine compound is to be added, it may be in the form of hydrofluoric acid, which is a common compound entraining no impurity into the acid, or possibly in the form of ammonium fluoride or ammonium bifluoride which participates by introducing ammonium ions.

Considering the volumes of manufactured phophoric acid, the substantial economical interest of the invention speaks for itself, whereby it is possible to obtain phosphoric acid depleted in Mg, and also depleted in Al and F under improved economical conditions, improved times involved and ease of implementation. The process of the invention can be applied to conventional solutions of phosphoric acid with a content by weight of P₂O₅ between 25% and 35% at the outlet of the sulfuric acid attack reactor; it also is applicable to other solutions.

DESCRIPTION OF PREFERRED EMBODIMENTS

The illustrative examples below illustrate the process of the invention

EXAMPLE 1

In this experiment, an industrial solution of phosphoric acid such as is most frequently found at the outlet of a production reactor has been reconstituted (all proportions, concentrations or contents are by weight in relation to the total weight):
P₂O₅=30%
Al₂O₃=0.25%, ie Al=0.13%
MgO=0.5% ie Mg+0.30%
CaO- -=0.2%
SO₄=0.7%

It should be noted that in this example the acid contains no fluorine impurities (atomic ratio F/Mg=0).

The atomic ratio Al/Mg is 0.38 and therefore below the preferred range of 0.8 to 2.

This acid is in a beaker at a temperature of 60° C. and simultaneously receives, while being agitated for 1 h, solutions of hydrofluoric acid, ammonium nitrate and aluminum nitrate so as to control the concentrations by weight at the following values:
NH₄=0.22%
Al=0.26%
F=2.35%

Therefore the molar ratio NH₄/Mg of the medium is 1.0, the atomic ratio of Al/Mg is brought to 0.8 and the atomic ratio of F/Mg is controlled to be 10.

After being at rest for 10 minutes, a white crystalline precipitate is formed, depositing on the bottom of the beaker, the supernatant solution being practically clear.

After an additional rest of 3 h, this precipitate is separated in about 5 minutes by decantation and filtration into a funnel with a paper filter, whereupon the precipitate is washed. An analysis was made of the solid precipitate, the liquid filtrate and the wash waters.

Precipitate: the composition was determined by chemical analysis, leading to the following formula for the compound obtained:

$(NH_4)_{0.48} (Mg)_{0.96} Al_{1.20} (F_{0.95}, OH_{0.05})_6$.

Analysis of this substance by x-ray diffraction shows this is a single phase compound with a crystalline structure similar to the structure of the known compound $NH_4 Mg Al (F, OH)_6, nH_2O$.

The presence of OH bonds is shown by infrared spectrometry.

Liquid filtrate: analysis of this filtrate gave the following percentages (relative to the concentrations of the particular element in the initial phosphoric acid):
$P_2O_5 = 94.95\%$
$MgO = 47.44\%$
$Al_2O_3 =$ negligible.

More than half the magnesium was eliminated at the cost of about 5% of $P_2O_5$.

Wash waters: The analysis of these waters gave the following percentages (still with respect to the concentrations of the particular element in the initial phosphoric acid) were found when analyzing these waters:
$P_2O_5 = 4.96\%$
$MgO = 10.56\%$
$Al_2O_3 =$ negligible.

These wash waters may also be used for pre-attack of the mineral permitting recovery of almost the totality of the losses of $P_2O_5$, in such a manner that the overall efficiency is almost 99.9% for the $P_2O_5$.

If the wash waters and the filtrate are considered jointly, the proportion of eliminated magnesium (expressed in percent MgO) is 42%, which is satisfactory separation in industry, with a negligible loss of $P_2O_5$.

EXAMPLE 2

The process was implemented on a solution identical with that of Example 1 and under similar conditions except that merely the content of added aluminum was changed, which presently is 0.53 and corresponds to an atomic ratio of Al/Mg = 1.6.

The precipitate obtained under the same conditions in this instance is a double phase system comprising:

primarily (95%) complex $(NH_4)_x Mg_y Al_z(F, OH)_6, nH_2O$ and the minor complex (in small amounts) $Mg Al (F, OH)_5, nH_2O$.

The presence of these two phases is shown by x-ray diffraction. In a series of similar experiments, it was possible to make the second phase vanish by increasing the amount of ammonium; this second phase disappears when the atomic ratio $NH_4/Al$ exceeds 1.

Analyses show that the liquid filtrate contains 99.7% of the initial $P_2O_5$ content and 19.84% of the initial MgO content; the wash waters contain 0.1% of the initial $P_2O_5$ content and 2.16% of the initial MgO content.

Therefore increasing the aluminum with respect to Example 1 led to extracting 78% of the magnesium (expressed in MgO) at the cost of a loss of $P_2O_5$ of 0.2%.

EXAMPLE 3

The process was carried out on a solution identical with that of Example 1 under similar conditions but modifying the amount of added ammonium nitrate to bring the ammonium percentage to 0.11% corresponding to a molar ratio $NH_4/Mg = 0.5$.

The precipitate obtained under the same conditions as before is a two-phase system formed by the same phases as in Example 2.

Analyses show that the liquid filtrate contains 91.39% of the initial $P_2O_2$ content and 42.2 of the initial MgO content. The wash waters contain 8.52% of the initial $P_2O_5$ content and 3.20% of the initial MgO content.

It should be noted that the decrease in the ammonium content with respect to Example 1 led to increasing difficulties in the physical separation of the precipitate because of the formation of the very amorphous second phase.

This Example shows that the second phase is present in larger amounts when the amount of ammonium is decreased relative to the aluminum.

EXAMPLE 4

The process was carried out on a solution identical to that of Example 1 and under similar conditions, modified only by the addition of hydrofluoric acid, the ratio $NH_4/Al$ and the ratio Al/Mg to bring the F percentage to 4.70% corresponding to an atomic ratio F/Mg = 20, the ratio $NH_4/Al$ being 2 and the ratio Al/Mg being 2.

The precipitate obtained under the same conditions is of one phase.

Analyses show that the liquid filtrate contains 96% of the initial $P_2O_5$ content and 2% of the initial MgO content; the wash waters contain 5.65% of the initial $P_2O_5$ content.

Increasing the content of fluorine, aluminum and ammonium relative to Example 1 therefore leads to extracting 98% of the magnesium (expressed in MgO) at the cost of a loss of 0.3% of $P_2O_5$.

The results obtained in the above examples should be compared with the average results from the known precipitation procedures which were cited above; as a rule these procedures allow extracting about 50% of the magnesium at the cost of a loss of 2 to 3% of $P_2O_5$.

We claim:

1. A process for the separation of impurities of magnesium, aluminum and fluorine from wet-process produced phosphoric acid by precipitating the impurities as a crystalline complex comprising adjusting the atomic ratio of fluorine to magnesium in the acid to at least 4 by the addition of a fluorine compound, adjusting the atomic ratio of aluminum to magnesium in the acid to at least 0.5 by the addition of an aluminum compound, adding an ammonium compound soluble in the phosphoric acid to the phosphoric acid so as to cause a reaction forming an insoluble complex of ammonium, magnesium, fluorine and aluminum, and causing a physical separation of said insoluble complex from said phosphoric acid.

2. A process as in claim 1 and including adding said ammonium compound so that the molar ratio of ammonium to magnesium is between about 0.5 and 4.

3. A process as in claim 1 and including adding said fluorine compound so as to adjust said atomic ratio of fluorine to magnesium so as to be within the range of about 4 to 20.

4. A process as in claim 3 and wherein said fluorine compound is hydrofluoric acid.

5. A process as in claim 1 and including adding said aluminum compound so as to adjust the atomic ratio of aluminum to magnesium so as to be within the range of 0.8 to 2.

6. A process as in claim 5 and wherein said aluminum compound is aluminum nitrate.

7. A process as in claim 1 and including adding said ammonium compound so that the molar ratio of ammonium to aluminum is greater than 1.

8. A process as in claim 1 and including seeding the phosphoric acid by the addition of said insoluble ammonium complex.

9. A process as in claim 1 and including carrying out said reaction at a temperature of between 50° and 70° C.

10. A process as in claim 1 and wherein said ammonium compound is ammonium nitrate for ammonia.

11. A process as in claim 1 and including carrying out said physical separation by filtration.

12. A process as in claim 1 and including carrying out said physical separation by decantation.

13. A process as in claim 1 and wherein said phosphoric acid includes about 25% to 35% $P_2O_5$.

* * * * *